United States Patent [19]

Allert

[11] Patent Number: 4,790,797

[45] Date of Patent: * Dec. 13, 1988

[54] LINK CHAIN

[76] Inventor: Kurt Allert, Panoramaweg 3, D-7238 Oberndorf, Fed. Rep. of Germany

[*] Notice: The portion of the term of this patent subsequent to Dec. 1, 2004 has been disclaimed.

[21] Appl. No.: 68,957

[22] Filed: Jul. 1, 1987

Related U.S. Application Data

[63] Continuation-in-part of Ser. No. 866,064, May 21, 1986, Pat. No. 4,710,153.

[30] Foreign Application Priority Data

May 21, 1985 [DE] Fed. Rep. of Germany ....... 3518160

[51] Int. Cl.$^4$ ............................................. F16G 13/07
[52] U.S. Cl. .................................... 474/211; 474/234
[58] Field of Search ................. 474/206, 209–211, 474/226, 230, 232, 234; 59/5, 7, 78, 84, 88, 90

[56] References Cited

U.S. PATENT DOCUMENTS

| 255,949 | 4/1882 | Dodge | 474/232 |
| 280,780 | 7/1883 | Assmus | 474/232 |
| 436,608 | 9/1890 | Miller | 474/234 |
| 955,377 | 4/1910 | Brisse | 474/234 |
| 1,953,388 | 4/1934 | Bettin | 474/233 X |
| 3,127,980 | 4/1964 | Lanham | 474/234 X |
| 3,522,743 | 8/1970 | Clark | 474/232 X |
| 4,050,323 | 9/1977 | I'anson | 474/234 X |
| 4,198,813 | 4/1980 | Hall, Jr. | 474/234 X |
| 4,710,153 | 12/1987 | Allert | 474/211 |

FOREIGN PATENT DOCUMENTS

85/01783 4/1985 PCT Int'l Appl. .

Primary Examiner—Thuy M. Bui
Attorney, Agent, or Firm—Herbert Dubno

[57] ABSTRACT

An elongated link chain includes a plurality of hingedly connected chain links. Each chain link is made of punched out sheet metal defining a first plane, and includes two lateral walls extending in the longitudinal direction of the chain and spaced from one another in a direction transverse to the longitudinal direction. At least one transverse web in the first plane rigidly interconnects the lateral walls for holding the walls in position with respect to one another. Each lateral wall includes an arm, and each arm has an end portion constituting a bearing pin. Each lateral wall has a separate bearing hole punched-out in the sheet metal for receiving the respective associated bearing pin of another identical chain link which is arranged adjacently to the bearing holes; the separate bearing holes are made coaxial with one another by bending the lateral walls in a direction approximately at right angles to the first plane, so as to extend in a second plane, and to constitute an approximately U-shaped bracket with the transverse web, in which the bearing holes are spaced at an axial distance from one another. The bearing holes define a first axis, and the parts of respective end portions of the bearing pins define a second axis, which axes are parallel to one another. The bearing pins are bent back so that at least parts of respective end portions extend in a direction approximately parallel to that of the transverse web.

6 Claims, 5 Drawing Sheets

4,790,797

LINK CHAIN

REFERENCE TO OTHER COPENDING APPLICATIONS

This application is a continuation-in-part application of Application Ser. No. 06/866,064 filed on May 21, 1986, now U.S. Pat. No. 4,710,153.

BACKGROUND OF THE INVENTION

The present invention relates generally to chains, and more particularly to link chains.

There are already known various constructions of link chains, such as lug chains, harness chains, flyer chains and roller chains, among them such which include a plurality of mutually hingedly interconnected chain links each of which has two lateral walls which extend in the longitudinal direction of the chain and are spaced from each other transversely of the chain. Then, a bearing pin is arranged at one end region of each of the lateral walls, such bearing pins being aligned with one another. However, chains of this construction exhibit a relatively complicated construction and are thus correspondingly expensive Furthermore, such known chain constructions can be devivated only slightly in the transverse direction, so that they are, for instance, not suited for three-dimensional advancement, among others, also not for their arrangement on chain drums which are intended to Wind up chains in a helical fashion. Also, the guidance of chains of the above type on sprocket wheel is not particularly good.

There is already known, for instance from the PCT application WO No. 85/01783, a link chain whose links are made of elastic synthetic plastic material. The respective chain link of this chain has two lateral walls which extend in the longitudinal direction of the chain and which are rigidly connected at one of their ends by a bearing sleeve, while each of them is provided at its other end with a respective bearing pin. These bearing pins are aligned with one another and they are directed toward each other. The lateral walls can be elastically bent in the outward direction to such an extent that these bearing pins can be inserted into the bearing sleeve of a neighboring chain link. However, because of their rather complicated structure, chain links of this type are not suited for manufacture from metal.

SUMMARY OF THE INVENTION

Accordingly, it is an object of the present invention to avoid the disadvantages of the prior art.

More particularly, it is an object of the present invention to provide a link chain which does not possess the drawbacks of the heretofore known chains.

It is yet another object of the present invention to develop a chain of the type here under consideration which has a high versatility.

Still another object of the present invention is so to construct the link chain of the above type as to be relatively simple in construction, inexpensive to manufacture even from metal, easy to assemble and use, and reliable in operation nevertheless.

In keeping with these objects and others which will become apparent hereafter, one feature of the present invention resides in an elongated link chain comprising a plurality of hingedly connected chain links, each link including two lateral walls extending in the longitudinal direction of the chain and spaced from one another transversely of the chain, each lateral wall having two end regions; two bearing pins each arranged at one of the end regions of one of the lateral walls in alignment with the respective other bearing pin; a transverse web rigidly interconnecting the lateral walls for holding such walls in position with respect to one another; and means for bounding a separate bearing opening in each of the lateral walls for the respective associated bearing pin of another identical chain link which is arranged adjacently to the bearing openings of the respective chain link, such separate bearing openings being coaxial with one another and axially spaced from each other.

A particular advantage of the link chain as described so far is that it has an extremely simple construction and that it can be manufactured at low expense. So, for instance, it can be provided at least in many cases for the chain links to be manufactured in one piece from sheet metal by punching-out and bending. There also exist other economical manufacturing possibilities. So, it is also possible, if so desired, to cost-effectively produce the bounding means in the form of bearing sleeves, and/or the bearing pins, separately from the remainder of the respective chain link, and to mount the same on such remainder. The chain links may be preferably made of metal. In many instances, they can consist of steel which is not hardened or, if desired, which is hardened or otherwise improved in quality. However, the chain may also be made of other suitable metals, such as for instance from brass. Also, its chain links can often be made either fully or partially of non-metallic materials; for instance, they may be injection molded from synthetic plastic materials. The chain links may be rigid or elastic and they may be configured identically to one another. It is currently preferred for the chain links to be non-elastic, inasmuch as higher strengths are obtained from the chain under these circumstances and yet the assembly of the chain links to form the chain can still be accomplished in an extremely simple manner. This chain is also suited for a fully automated production thereof.

A relatively simple construction which is particularly suited for the manufacture of the chain link from sheet metal is obtained when the chain link includes a U-shaped bracket having two legs, and two arms connected with the bracket, the legs and the arms together constituting the lateral walls, and when the bearing pins are arranged at respective end regions of the arms and the bearing openings are provided in the legs. Advantageously, the arms are arranged on the legs of the bracket, preferably at one-half the height of the legs.

According to another advantageous facet of the present invention, the bearing pins are arranged at a predetermined axial distance from one another. In this respect, it is advantageous when this distance approximately corresponds to the axial distance of the bearing holes from each other. A particular advantage of this construction is that, when the thus constructed chain is to be used with a sprocket wheel having a plurality of teeth and intermediate spaces therebetween, that the two bearing pins and the lateral walls with the bearing holes of the chain link leave free spaces between themselves for penetration of the sprocket wheel thereinto. The transverse web, which is arranged outwardly on the respective chain member at a distance from the plane of this chain link which is determined by the two mutually parallel pivoting axes associated with this particular chain link, in the event that the chain is utilized in conjunction with at least one sprocket wheel, engages such a sprocket wheel in the respective intermediate space of the sprocket wheel to serve as an entraining element. The sprocket wheel can then penetrate into or through the space between the bearing pins and the lateral walls which carry such bearing pins. This renders possible a particularly good lateral guidance of the link chain on the sprocket wheel, whereas such good guidance is not achievable, for instance, in lug chains.

When, as preferably provided for, the transverse webs of the chain links serve as entraining elements which penetrate into the intermediate spaces between the teeth of the respective sprocket wheel, even the pitch circle diameter of the link chain is increased at a given height of its chain links, as a result of the arrangement of each transverse web at a distance from the geometrical place which is defined by the two adjacently located pivoting axes of the affected chain link. This increase in the pitch circle diameter produces a particular advantage, among others because, for a given pitch circle diameter, the link chain can be arranged, as a result of this, in a much more space-saving manner than known lug chains. Then, the pivoting axes of the chain link which are determined by the longitudinal axes of the bearing pins have a smaller spacing from the axis of rotation of the respective sprocket wheel than the transverse webs of the chain links. In the case of use of the chain as a force-transmitting member in a pulling drive, however, the pitch circle diameter, which is determinative of the transmission ratio of such drive, is determined by the position of the transverse webs and not by the positions of the bearing or pivoting axes of the individual chain links. This is particularly advantageous, especially space saving.

It is further advantageous when the smallest free distance between the lateral walls is only slightly larger than the width of that region of the sprocket wheel which penetrates between the lateral walls, for lateral guidance of the link chain on the sprocket wheel.

According to another advantageous aspect of the present invention, the transverse web has a rectangular cross section and the width of the transverse web is considerably smaller than the length of the lateral wall. It is also advantageous when the play of the bearing pins in those of the bearing holes which receive the same and the lateral play of the lateral walls are dimensioned to operatively permit three-dimensional flexing of the link chain. At least one additional transverse web which also interconnects the lateral walls may be provided on the respective chain link. Both of such transverse webs are then advantageously arranged at the upper region of the lateral walls.

The link chain constructed in accordance with the present invention is also characterized by universal possibilities of use. So, the chain of the present invention is excellently suited for use in the following applications: as a link chain for pulling drives; as a conveyor chain for conveyors, as a load-carrying chain for the lifting and carrying of loads; as an armoring chain for the armoring of elastomeric or other structural elements, such as holding rings, seals, lip seals and the like; as a driving chain; as a link chain for toys; as a driven chain, and so on.

The link chain according to the present invention can also be used to a particular advantage in connection with sprocket wheels which guide or drive the chain or are driven thereby, especially also as an endless link chain. For use as such link chain, it is often sufficient and advantageous that the bearing plays of their pivot bearings which comprise the two parallel pivoting axes for each of the chain links are so minute that the chain can be bent, for all intents and purposes, only in one plane, that is, it allows practically only a two-dimensional movement. However, the chain can also be built, without encountering any difficulties, in such a manner that it has a good curve-hugging capability, that is, that it can be flexed rather strongly even along a direction transverse to its longitudinal direction. Thus, the chain can be further developed in such a manner that, in contradistinction to the lug chains which permit only a two-dimensional movement of the chain, the chain of the present invention can permit even a three-dimensional movement, by making a provision for the bearing play of the pivoting bearings of the chain links of this chain and the lateral play of the mutually overlapping lateral walls relative to one another to be sufficiently large for this purpose.

Thus, the link chain according to the present invention can be used without difficulty even in conjunction with chain drums, onto which the chain is to be wound in a helical fashion, or even for such pulling drives in which the link chain follows a three-dimensional path, in application where up to now no lug chains have been used, but rather the more complicated and more expensive coil chains have to be used as the pulling means. However, such coil chains have much worse properties, especially also much worse running properties, than the chains constructed in accordance with the present invention.

The link chain in accordance with the present invention is also excellently suited for meshing with sprocket wheels which are provided with teeth. This chain provides the possibility, among others and if desired, to employ even very small sprocket wheels. Moreover, the engagement of the transverse webs of the chain links in the intermediate spaces between the teeth of such sprocket wheels can be so provided, without any problems, that even the highest force transmissions can be reached which are permissible for the chain or for the sprocket wheel, so that the transverse webs of the brackets positively engage in the intermediate spaces between the individual teeth of the sprocket wheels so deeply and completely, that even the highest permissible forces can be transmitted.

The link chain of the present invention can be produced, for all intents and purposes, in any chosen size. The chain links may be provided with extremely small dimensions just as well as intermediate and large dimensions. Thus, the chain according to the present invention can cover a wide area which, to all intents and purposes, is not covered by conventionally constructed lug chains. Thus, the chain constructed in accordance with the present invention can find more applications than lug chains even in this respect.

When the link chain constructed in accordance with the present invention is used for conveyors, it can form either alone or in conjunction with other such chains a "transport track" for the objects to be transported, onto which such objects can be placed. In the alternative, holding components can be provided on the link chain or on the link chains for the objects to be carried and to be conveyed by such a link chain or by such link chains. Such components may be constructed as hooks, carrying baskets and the like.

This chain is also outstandingly suited for use as an armoring for the reinforcement of elastomeric or other deformable parts, the deformability of which parts is to be rendered more difficult or to be limited by at least one link chain which is inserted into or embedded in such a part, for instance, in order to avoid overextension, as it may otherwise be the case in sealing elements, holding rings and the like.

The chain constructed according to the present invention is also space-saving and it can be produced in relatively small sizes. It is also characterized by a high loadability for any given size of its chain links, and a low degree of wear. Altogether, the present invention provides an extremely economical and universally usable link chain.

It is further an advantage that the chain links can be produced in the same size with respect to one another. In the event that a chain lock is provided in the chain, such a chain lock may have a different configuration than the regular chain links constructed in accordance with the present invention. So, for instance, it may include axially displaceable bearing pins. In some cases, it may also be advantageous to construct at least two chain links differently from the rest. The chain links may also be provided with at least one carrying or work component each, such as, for instance, with a scraper pin, a conveying component such as a carrier hook, a fork, an angled element to serve as the conveying element, or the like, or it may be provided with measures or formation for the attachment of conveying components, such as hooks, forks, pins or the like. Only selected ones, or all, of the chain links may be provided with such carrying or work components. When at least two of the chain links have different configurations or constructions, they may still be preferably similar to one another that is, they may differ from one another only in the details of their construction, such as different or missing measures or formations for the attachment of the conveying components.

The present invention is also directed to a sprocket wheel which is particularly suited for use with a link chain constructed in accordance with the present invention and including a plurality of hingedly interconnected chain links each having two lateral walls each of which carries a bearing pin and is provided with a bearing hole for receiving the associated bearing pin of a neighboring chain links, and a transverse web interconnecting the lateral walls, such a sprocket wheel comprising a plurality of teeth which define a corresponding number of intermediate spaces therebetween, the intermediate spaces being so configured as to permit the transverse webs of the chain links at least partially to penetrate thereinto for establishing a positive engagement between the sprocket wheel and the link chain. As a result of this construction, the transverse webs of the chain links serve as entrainment elements which cooperate with the sprocket wheel for a positive coupling of the link chain with the sprocket wheel. In special cases, it can also be provided that the chain links include other portions or elements which penetrate into the intermediate spaces between the teeth of the sprocket wheel. So, for instance angularly projecting entrainment members or portions may be provided on the legs of the bracket at a distance from the transverse webs or on the arms, or the bearing pins can project beyond the bearing holes receiving the same to serve as entrainment elements which penetrate into and engage in the intermediate spaces of the sprocket wheels.

Advantageously, the intermediate spaces are so dimensioned as to permit the transverse webs of the chain links to penetrate all the way to the respective bottoms thereof. In this manner, there is obtained a uniformly deep engagement of the transverse webs of the link chain in the intermediate spaces between the teeth of the sprocket wheel, and also an optimum force transmission.

The link chain constructed in accordance with the present invention also renders it possible to achieve good holding and seating action even on narrow sprocket wheels, so that it is possible for the sprocket wheel to comprise a disk-shaped portion provided with the teeth and intermediate spaces at its periphery and for the disk-shaped portion with the teeth to be an embossed metal sheet part. This metal sheet part may either constitute the sprocket wheel in its entirety, or there may be further provided a hub or the like on such metal sheet part, so that the sprocket wheel of this construction is significantly more economical than heretofore customary milled sprocket wheels.

When a particularly small width of the link chain is desired, this can be achieved in a simple manner in such a manner that the two bearing pins of the chain link are directed away from one another. As a result, the regions of the two lateral walls which are situated in the immediate vicinity of such bearing pins are received between the lateral walls of the respective neighboring chain link which are provided with the bearing holes that receive such bearing pins. Even this renders it possible to achieve an especially narrow, cost-efficient construction of the sprocket wheels, as they are described above. When at least one sprocket wheel is associated with the link chain, arrangements may advantageously made for the smallest free spacing of the lateral walls of the chain link to be only slightly larger than the width of the region of this sprocket wheel which penetrates between such lateral walls, so as to achieve a good guidance of the link chain on the sprocket wheel.

In accordance with another advantageous feature of the present invention, the bearing pins are directed toward one another. In this manner, there is obtained a particularly good guidance of the link chain on a sprocket wheel, among others because the regions of the lateral walls which provide for the lateral guidance of the link chain on the sprocket wheel can have relatively large surface areas and thus can effect a correspondingly good, especially low-wear guidance of the link chain on the sprocket wheel. Also, the assembly of the chain links can be accomplished in an especially simple manner as far as the assembling operations are concerned. It is also advantageous when at least one of the bearing pins of the chain link also constitutes an entraining element of the chain link which serves for the engagement in the intermediate space of the sprocket wheel. The bearing pins may advantageously contact one another under these circumstances. Furthermore, a roller may be supported at least on one of the bearing pins for rotation about the axis of the bearing pin.

BRIEF DESCRIPTION OF THE DRAWING

The present invention will be discussed in more detail below with reference to the accompanying drawing, in which.

DETAILED DESCRIPTION OF THE PREFERRED EMBODIMENTS

Figure 6:
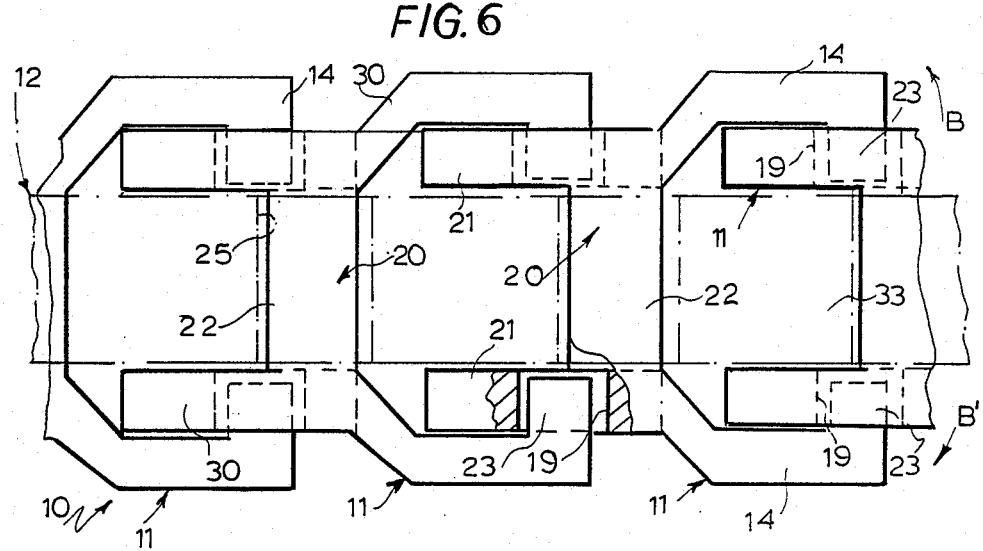
FIG. 6 is a partially sectioned top plan view of the link chain section depicted in FIG. 5.
Figure 5:
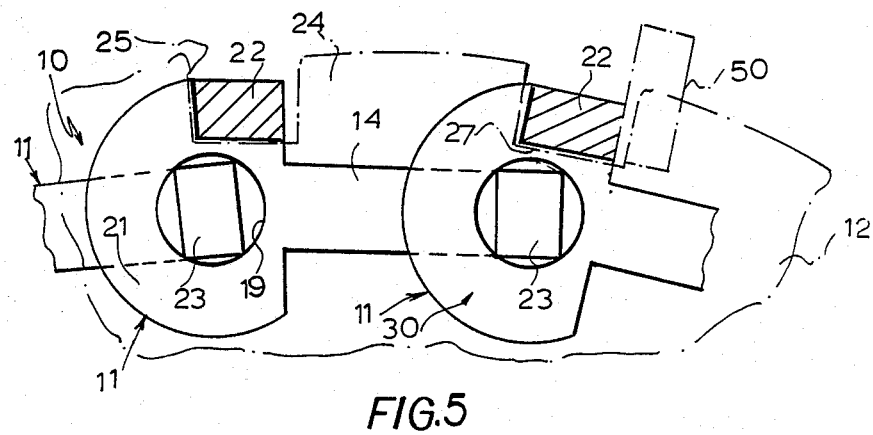
FIG. 5 is a partially sectioned side elevational view of a section of a link chain assembled from the links of FIGS. 3 and 4, the section being taken on line 5—5 of FIG. 3, together with a corresponding meshing portion of a sprocket wheel which is shown in dash-dotted lines.

Referring now to the drawing in detail, and first to FIGS. 5 and 6 thereof, it may be seen that the reference numeral 10 has been used therein to identify a link chain in its entirety. The link chain 10 is assembled from a multitude of respectively identical chain links 11 each of which is unitary and is constructed in the manner which is clearly depicted in FIGS. 3 and 4 of the drawing. The link chain 10 may be an endless chain which may preferably be used as a pulling medium of a pulling drive or transmission, or as a conveyor chain of a chain conveyor. However, the link chain 10 may also be a finite chain, such as a load-carrying chain. Furthermore, the link chain 10 may also be used as an armoring chain for armoring deformable objects, such as annular seals or the like. Even other uses for the link chain 10 can be contemplated, such as for toys. A section of a sprocket wheel 12 which meshes with the link chain 10 is indicated in dash-dotted lines in FIGS. 5 and 6.

Figure 1:
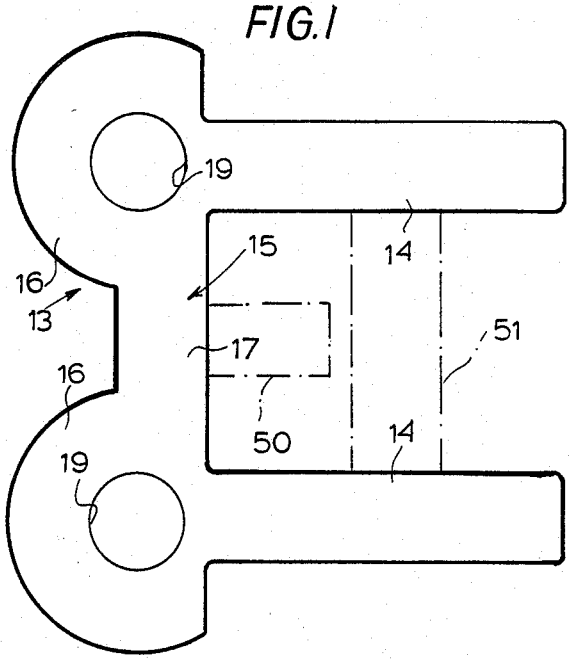
FIG. 1 is a top plan view of a flat punched-out sheet metal part from which a chain link of a link chain according to the present invention can be produced by bending.
Figure 2:
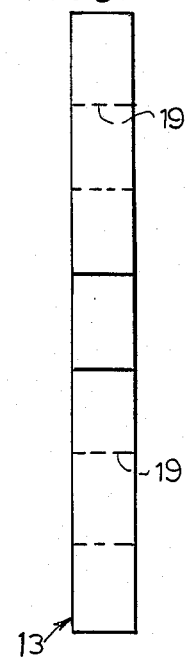
FIG. 2 is a left-side end elevational view of the punched-out part of FIG. 1.

The individual chain link 11 (see also FIGS. 3 and 4) is in each instance produced by bending from a unitary flat punched-out part 13 which is shown in FIGS. 1 and 2 of the drawing, and preferably so as to be non-elastically rigid. This punched-out part 13 has a constant thickness of, for example, 0.5 to 5 millimeters. However, this thickness may be even greater or even smaller. The punched-out part 13 may also be punched out of a metal sheet, for instance out of a steel sheet, or in simpler cases out of iron sheet or even out of sheets made of other metals.

This still flat punched-out part 13 has two arms 14 which are arranged perpendicularly with respect to a transverse section 15, which constitutes a bracket 20 in the finished chain link 11, and extend from this transverse section 15. The transverse section 15 includes two regions 16 which have circular segment configurations and which are connected with one another by a short web 17 which has a constant width. Each of the two regions 16 is provided with a bearing hole 19 which is circular and is concentric with the central point of the radius of the associated circular-segment region 16. These bearing holes 19 constitute the bearing holes 19 of the chain link 11 depicted in FIGS. 3 and 4 which is produced by bending from the punched-out part 13. The entire transverse section 15 forms after bending the approximately U-shaped bracket 20 of the chain link 11, whose two legs 21, which are approximately parallel to one and other but which can also diverge from each other in their longitudinal directions and/or in the longitudinal direction of the link chain 10, are basically constituted by the two regions 16 of the punched-out part 13, and whose transverse web or center web 22 is constituted by the web 17 and by small partial zones of the regions 16 of the punched-out part 13. The central points of the two mutually aligned bearing holes 19 are situated approximately at the half-height of the chain link 11. The two arms 14 extend also at this approximately half-height of the chain link 11 from the two legs 21 of the bracket 20 in the longitudinal direction of the chain link 11 toward the neighboring chain link 11. These two arms 14, commencing at their respective bases, at first diverge from one another in the outward directions, then extend parallel to one another, and finally they are angularly bent at right angles toward each other in order to form respective bearing pins 23, as is particularly clearly shown in FIG. 3 of the drawing. These two bearing pins 23 have approximately rectangular configurations with the larger dimension extending normal to the plane of FIG. 3, and they are aligned with one another. The bearing pins 23 are introduced, during the assembly of the link chain 10, from the outside into the two bearing holes 19 of the respective neighboring chain link 11 which has the same configuration as the chain link 11 in question, for pivotal mounting of the two chain links 11 which are connected with one another by the bearing pins 23, as can be seen in FIGS. 5 and 6 of the drawing. The bearing pins 23 have a distance from one another which substantially corresponds to the distance of the bearing holes 19 from each other and in the assembled condition they preferably terminate still in the bearing holes 19 or their free end faces are flush with the surfaces onto which the bearing holes 19 open. Preferably, these bearing pins 23 do not narrow the space between the legs 21, which is advantageous for the engagement by the sprocket wheel 12, the guidance of the link chain 10 on the sprocket wheel 12, and for a large pitch circle diameter of the link chain 10. The minimum distance between the arms 14 of the chain link 11 is equal to or greater than the distance of the legs 21 of the bracket 20 from one another. The longitudinal axes of the bearing pins 23 of the chain link 11 are parallel to the longitudinal axes of their associated bearing holes 19, so that a chain assembled of such chain links 11 can be wrapped around the sprocket wheel 12 at any desired angle of contact.

Figure 9:
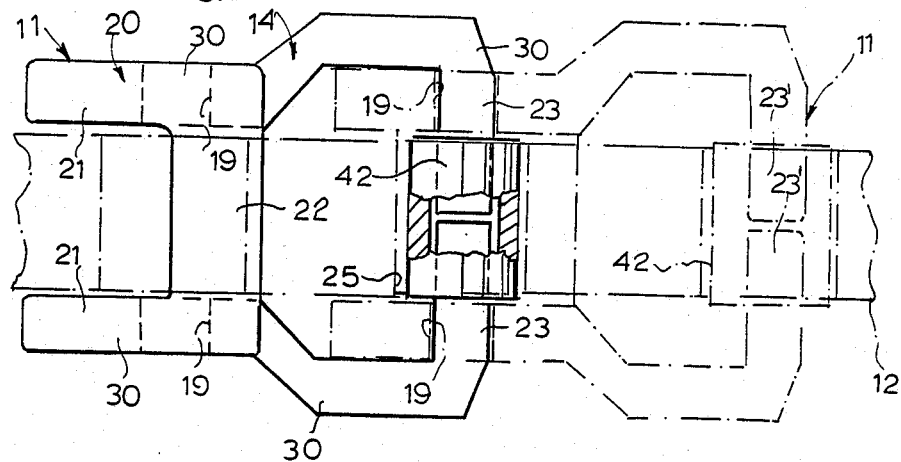
FIG. 9 is a view similar to FIG. 8 but of a further chain link modification.

The distance of the two bearing holes 19 of the chain link 11, which corresponds to the distance of the two legs 21 from one another, results in an intermediate space 33 between the two legs 21, and thus even the intermediate space between the bearing holes 19 formed as a consequence of this intermediate space 33, is completely free, so that the sprocket wheel 12 can penetrate in any desired manner into this intermediate space 33 and thus between the bearing holes 19, as is shown in FIGS. 5, 6 and 9 where the bearing holes 19 are situated at respective two sides of the sprocket wheel 12 interposed therebetween.

The chain link 11 can also be defined in such a manner that it includes two upright lateral walls 30 which extend in the longitudinal direction of the link chain 10, and each of which is constituted by a respective leg 21 and a respective arm 14. Now, these lateral walls 30 are rigidly connected with one another at their upper regions close to their longitudinal centers by a transverse web 22. Each of the lateral walls 30 is offset by means of the short inclined region 31, is provided at its one longitudinal region with the bearing hole 19, and is angularly deformed at its other end region for the formation of the bearing pin 23. These lateral walls 30 are immovably and integrally connected with the center or transverse web 22 and are connected with one another only by means of such a transverse web 22. The lateral walls 30 have, like the transverse web 22, approximately rectangular cross sections.

Each of the chain links 11 of this link chain 10 is constructed identically to any other of the chain links 11 of the same link chain 10. However, if so desired, a chain lock may be provided in the event that the link chain 10 is an endless chain for connecting the ends of the link chain 10 which is assembled from respective identical chain links 11. Yet, this link chain 10, if provided as an endless chain, can also be manufactured or assembled solely from the chain links 11 disclosed here.

Each of the chain links 11 is symmetrical with respect to its longitudinal central plane 29. Inasmuch as the arms 14 of the respective chain link 11 partially overlap from the outside the two legs 21 of the respective neighboring chain link 11, they do not narrow the inner space of the chain links 11. This renders it possible to provide sprocket wheels, such as that indicated at 12, for this link chain 10, whose width at the area of meshing with the link chain 10 is only slightly smaller than the width of the free intermediate space 33 between the legs 21 of the U-shaped bracket 20 of the individual chain link 11, inasmuch as the bearing pins do not project inwardly beyond the legs 21.

A section of one chain sprocket wheel 12 is depicted in FIGS. 5 and 6 in dash-dotted lines. As can be seen therein, respective spaces 25 provided between individual teeth 24 of the sprocket wheel 12 can have depths which, without running into any difficulties, can be equal to or greater than the height of the central web 22 of the bracket 20 of the individual chain link 11, which engages in such spaces 25, so that the transverse webs 22 which are provided at the upper regions of the chain links 11 can fully penetrate into and be accommodated in the respective spaces 25. This makes it possible to achieve a particularly high force transmission at low surface pressures between the transverse web 22 and the respective tooth flank of the sprocket wheel 12.

Inasmuch as the transverse webs 22 of the chain links 11 can rest as the bottoms of the tooth spaces 25, the legs 21 then correspondingly overlap the sprocket wheel 12 in a radial direction which is aimed toward the axis of rotation of the sprocket wheel 12, in such a manner that the bearing holes 19 are closer to the axis of rotation of the sprocket wheel than the tooth spaces 25, which is particularly advantageous.

Since these transverse webs 22 can further preferably have approximately rectangular cross sections, there is obtained, as a result of this a particularly good positive engagement between the transverse webs 22 and the teeth 24 of the sprocket wheel 12. Also, there can be obtained a meshing of the chain links 11 with the sprocket wheel 12 which is, for all intents and purposes, free of play, by suitable configuration of the teeth 24 and of the tooth spaces 25 of the sprocket wheel 12. Thus, the force transmission between the sprocket wheel 12 and the link chain 10 is extraordinarily good, and it is possible to transmit relatively high forces. Even the lateral guidance of the chain 10 on the sprocket wheel 12 is optimal.

In the construction described above, the cross sections of the bearing pins 23 of the individual chain links 11 are, because of their being stamped out from an even metal sheet, approximately rectangular. However, if so desired the bearing pins 23 can be rounded to a greater or lesser degree, for instance, by embossing and, if so desired, they can even be obtained with circularly rounded configurations. However, at least in the simplest cases, it is sufficient when these bearing pins 23 have approximately rectangular or square cross sections, which has, among others, the advantage of especially cost effective manufacture.

An advantage of the described chain 10 is also that the link chain 10, owing to its good lateral guidance on sprocket wheels 12, can be so narrow that the associated sprocket wheel 12 then can correspondingly be so narrow that it can be produced in a cost-effective manner by punching out and possibly embossing from a metal sheet, so that its teeth 24 then need no longer be milled, in contrast to what is currently customary in known sprocket wheels.

Figures 3, 4:
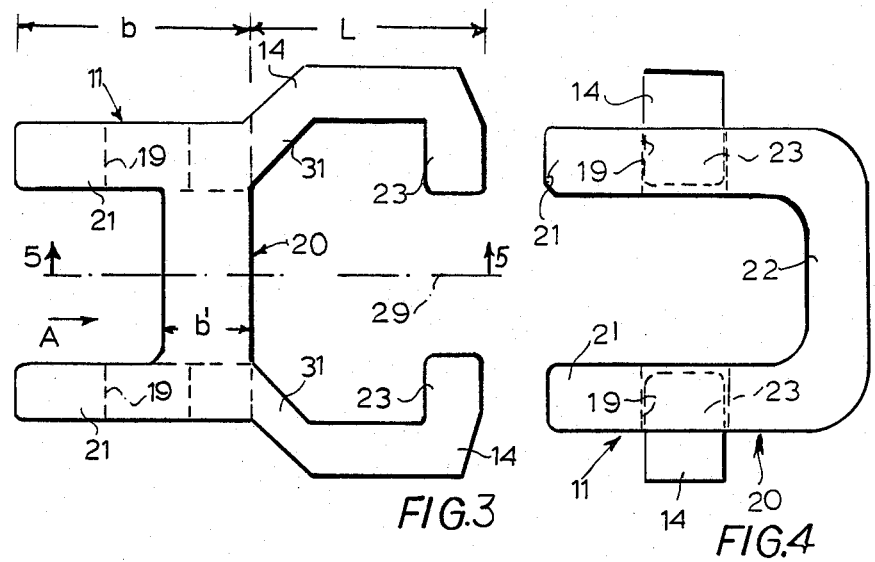
FIG. 3 is a top plan view of a chain link which has been produced from the punched-out part of FIGS. 1 and 2 by bending.
FIG. 4 is an end view of the chain link of FIG. 3, taken in the direction of an arrow A of FIG. 3.
Figure 3A:
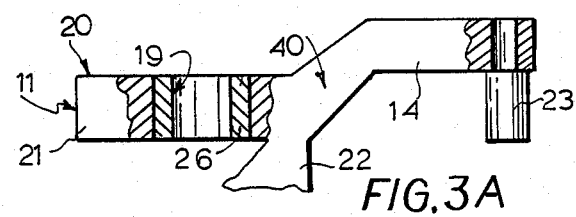
FIG. 3A is a partially sectioned fragmentary view akin to that of FIG. 3 but showing a modification of the chain link.

In a modified construction of the chain link 11 of the type depicted in FIG. 3, which is illustrated in FIG. 3A of the drawing, the bearing pins 23, which in this instance have circularly rounded cross sections, are not integral or unitary with the remainder of the respective chain link 11, that is of one piece therewith; rather, they are separate from such remainder and in particular the arms 14, and are riveted thereto. Even the bearing holes 19 are here not constituted by holes punched into the legs 21, but rather are formed by bearing sleeves 26 which are inserted into such punched-out holes and are received therein with, for instance, a press fit. However, such bearing sleeves 26 do not extend beyond the confines of the respective legs 21. These measures render it possible to make the bearing sleeves 26 and/or the bearing pins 23 of materials, especially metals, which have particularly advantageous properties for use as bearing materials, and to make a remaining main body 40 of the respective chain link 11 integrally of another material which, for instance, is capable of withstanding particularly high tensile forces or is especially cost-effective and easy to punch out and to bend. The main body 40 can be preferably constructed as a one-piece metal sheet part, or it can be injection molded from a synthetic plastic material.

The overall length of the respective chain link 11 is, in the construction depicted in FIGS. 3 to 6 of the drawing, several times, as illustrated about 5 to 6 times, greater than the width of its transverse or center web 22 which has rectangular cross sections. However, the web 22 could be even wider or even narrower than what is illustrated, and the arms 14 can also be longer or shorter than what is illustrated, in the event that longer or shorter chain links 11 are desired. Even the width and the height of the chain link 11 can be made smaller or larger than illustrated.

The separate bearing holes 19 of the chain link 11 are in all constructions arranged in the longitudinal end portions of the lateral walls 30 of the respective chain link 11 which are remote from the bearing pins 23, and their spacing from one another corresponds to the distance of the lateral walls 30 from each other at the regions of the bearing holes 19. The passage which is thus left open between the two associated bearing holes 19 can be utilized as a passage for chain sprocket wheels 12 and/or other parts, as for instance in the construction depicted in FIG. 7 also as a free space for the arms 14 of a neighboring chain link 11.

This link chain 10 constructed in the manner illustrated in FIGS. 5 and 6 of the drawing is extremely simple as far as its construction is concerned and is cost effective. It is even capable of transmitting high forces and it makes it possible to obtain a particularly good, large-area contact with the associated sprocket wheels 12. This also results in a low degree of wear on the chain sprocket wheel 12 and on the transverse webs 22 which mesh with the sprocket wheel 12. A further advantage is the very good guidance of the link chain 10 by the chain sprocket wheels 12 as a result of the provision of the legs 21 of the bracket 20 which achieve a very good lateral guidance on the chain sprocket wheels 12, in that their relatively large wide sides which face toward the chain sprocket wheel 12 can co operate with the sprocket wheel 12 for the lateral guidance of the link chain 12. Even the preferably provided complete penetration and/or immersion of the transverse Webs 22 in the tooth spaces 25 of the chain sprocket wheels 12, preferably until they rest on the bottoms 27 of such spaces 25, is advantageous. However, at least for some applications, it may be provided instead that these transverse webs 22 only partially penetrate into the tooth spaces 25 and/or that they do not touch the bottoms 27 of such spaces 25, when this is desired for any reasons whatsoever. However, it is possible to obtain a good and high force transmission even under these circumstances.

In the chain links 11 according to FIGS. 3 to 6, the arms 14 are bent in a hook-shaped configuration with their hook openings being directed toward one another.

Figure 7:
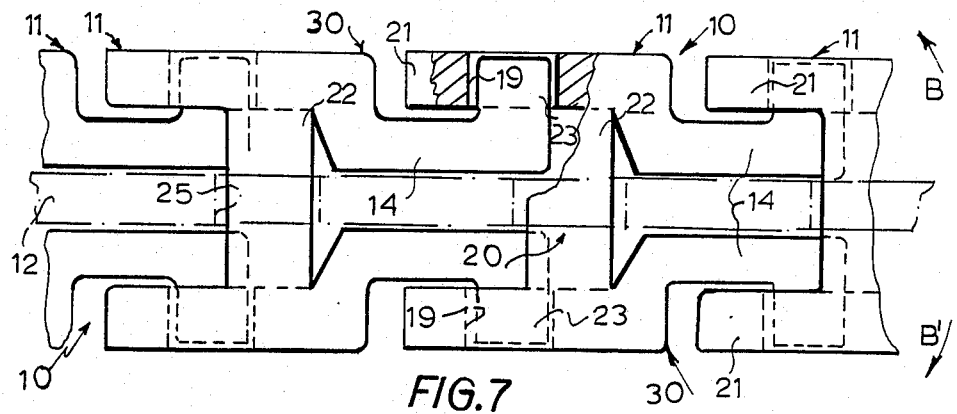
FIG. 7 is a view similar to FIG. 6 but showing a modified construction of the chain links from which the link chain is assembled.

In FIG. 7 of the drawing, there is shown a portion of another modified construction in which the link chain 10 again meshes with a sprocket wheel 12 that is indicated in dash-dotted lines. The tooth spaces 25 of this particular sprocket wheel 12 are somewhat wider than the width of the transverse or center webs 22 of the chain links 11. The respective chain link 11 of this link chain 10 differs from that illustrated in FIGS. 3 to 6 of the drawing basically in that the arms 14 which are provided with the bearing pins 23 are not outwardly bent commencing at the legs 21 of the U-shaped bracket 20 of the respective chain link 11 which carry the arms 14. Rather, such arms 14 are bent inwardly and thus they penetrate in the assembled condition of the link chain 10 between the two legs 21 of the U-shaped bracket 20 of the neighboring chain link 11. From this internal space between the two brackets 20, the mutually aligned bearing pins 23 of the respective arms 14 extend into the bearing holes 19 of the legs 21 of the respective neighboring chain link 11 for mounting of these two chain links 11 on one another for pivoting relative to each other about an axis which is determined by the two associated bearing pins 23 The arms 14 are again bent to hook-shaped configurations, but this time their hook openings face away from one another in the outward directions.

The flat punched-out element 13 for the fabrication of the respective chain link 11 according to FIG. 7 of the drawing can be configured similarly or identically to the punched-out element 13 depicted in FIGS. 1 and 2 of the drawing, so that the U-shaped bracket 20 of the chain link 11 according to FIG. 7 can correspondingly completely correspond to the bracket 20 of the chain link 11 of FIGS. 3 to 6 and the difference need only reside in the different bending of the arms 14 Therefore, if so desired, it is even possible to combine the chain links 11 according to FIGS. 3 and 7 with one another in the same link chain 10, such as, for instance, by arranging these different types of chain links 11 alternatingly or different types of the chain links 11 at respective regions of the link chain 10.

The legs 21 and the arms 14 of the chain link 11 of FIG. 7 again form two lateral walls 30 which extend in the longitudinal direction of the link chain 10.

In the link chain 10 according to FIG. 7, only the free space between the two arms 14 of the respective chain link 11 is available for the penetration of the sprocket wheel 12, so that this particular link chain 10 is suited especially for use with very narrow sprocket wheels 12, on which it is also very well guided by means of the arms 14.

The lateral guidance of these link chains 10 according to FIGS. 5 to 7 is excellent in each instance, and it is better than that which can be achieved in roller chains, so that the link chains 10 constructed in accordance with the present invention can be used in many instances where additional lateral guiding means would already be required for the guidance of roller chains without using any such additional lateral guiding means.

Link chains 10 according to the present invention are also capable of transmitting relatively high tensile forces, which can be significantly larger than those which can be transmitted by wire chains of comparable size and which are often of a magnitude comparable to or even greater than that which can be transmitted by roller chains of comparable size. It is also possible to keep the height of the individual chain links 11 smaller than in roller chains with comparable tensile force transmission capability, and a predetermined pitch circle diameter for the link chain 10 on a sprocket wheel 12 with a predetermined outer diameter can be achieved with a considerably smaller outer radius of the region of the chain 10 which meshes with the sprocket wheel 12, than when using a roller chain. In this manner, it is possible, for instance, to achieve higher transmission ratios in tensile traction transmissions than when using roller chains, without increasing the demands for available space.

Furthermore, the chain links 11 of the link chains 10 may be made shorter than in roller chains of comparable size and, as a result, the number of the teeth 24 of the chain sprocket wheel 12 may be correspondingly increased while maintaining the same initially predetermined sprocket wheel diameter, which is also advantageous in many instances.

The link chain 10 according to the present invention can thus be used instead of the roller chains. However, it can also be utilized as a replacement for other types of chains, such as wire chains, coil chains, bridged coil chains, sleeve chains and so on.

When the link chains 10 constructed in accordance with the present invention are used for conveying purposes in conveyors, they can serve the purpose of conveyance individually, or at least two such link chains 10 may be arranged parallel to one another, so that then the conveying path is formed by a corresponding number of the link chains 10.

For conveyance purposes, the link chains 10 according to the present invention also have the advantage that they can be constructed, without encountering any difficulties, so as to permit greater lateral deviations than roller chains. What is meant here by lateral deviation is a deviation of the link chain 10 in the direction of an arrow B or of an arrow B', both of which are shown in FIGS. 6 and 7 of the drawing. The magnitude of the maximum possible angle of this lateral deviation in the direction of the arrow B or of the arrow B', which the respective chain link 11 permits with respect to the neighboring chain link 11, depends on the play of the arms 14 of one of the chain links 11 with respect to the legs 21 of the respective neighboring chain link 11 and-/or the bearing play encountered between the bearing pins 23 and the associated bearing holes 19 receiving such bearing pins 23 of the respective cooperating neighboring chain links 11. Consequently, this maximum angle can be selected or provided as desired within certain limits by corresponding dimensioning of the affected portions of the chain links 11. On the other hand, this possibility does not exist in roller chains.

As is further shown in FIG. 3 of the drawing, a width b of the legs 21 of the bracket 20 of the chain link 11 is greater, advantageously significantly greater, for instance two to three times greater than a width b' of the center web 22. As shown in FIGS. 3 and 5, the legs 21 project considerably beyond the center web 22 in the longitudinal direction of the link chain 10 at the sides thereof which face away from the arms 14. A length L of the arms 14 approximately corresponds in the illustrated constructions to the width b of the legs 21, or it is somewhat greater, which is also advantageous. Even other dimensions are possible, however.

Figure 8:
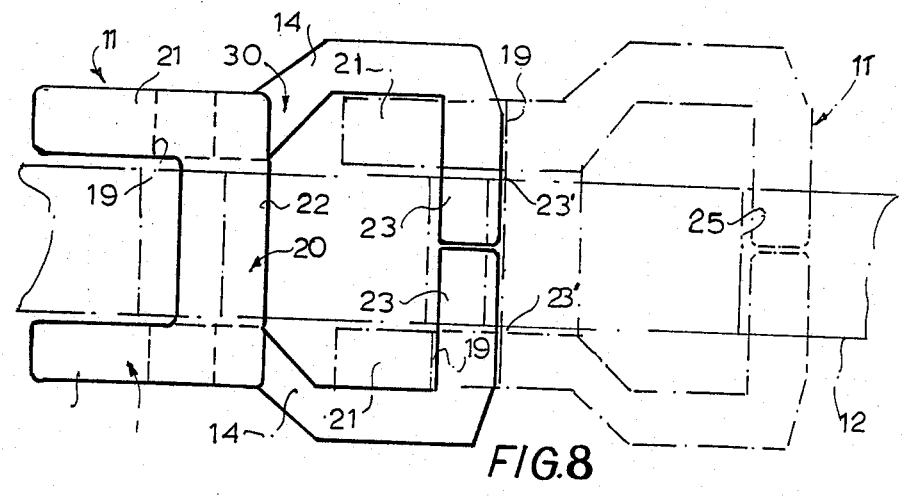
FIG. 8 is a top plan view similar to FIG. 6 but showing a modification of the chain link construction.

FIG. 8 shows another modification of the chain link 11 which is shown in solid lines, together with another, neighboring, identical chain link 11 which is hingedly connected with the first-mentioned chain link 11 and which is shown in dash-dotted lines, as well as a section of a chain sprocket wheel 12 which is also indicated in dash-dotted lines. This particular chain link 11 differs from that illustrated in FIG. 3 only in that the two bearing pins 23 which are aligned with one another are extended in the directions toward one another in such a manner that they abut one another or that they are at only a minute distance from each other. Under certain circumstances, these two bearing pins 23 can even be connected with one another by a welding spot, especially when it is desired that the link chain 10 consisting of such chain links 11 have a particularly high rigidity.

Figure 10:
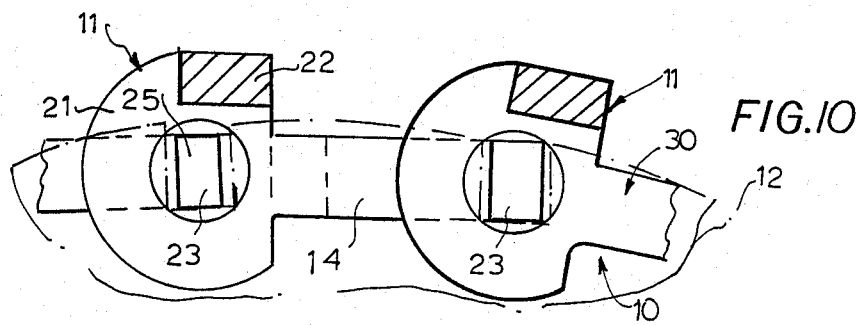
FIG. 10 is a partially sectioned side elevational view similar to FIG. 5 but of the modification of FIG. 8.

A portion of such a link chain 10, which is made up of such one-piece chain links 11 in accordance with FIG. 8 is shown in FIG. 10 in a longitudinal section, together with a section of a sprocket wheel 12 which meshes with this link chain 10 and which is indicated in dash-dotted lines. In this particular construction, the transverse webs 22 of the chain links 11 no longer constitute the entraining portions which engage in the tooth spaces 25 of the sprocket wheel 12; rather, the entraining portions of the link chain 10 are constituted in this construction of the link chain 10 by the bearing pins 23 and more particularly by their regions 23' which are situated in the intermediate space present between the two legs 21 of the bracket 20 of the respective neighboring chain link 11. As a result, the pitch circle diameter of this link chain 10 corresponds to the pitch circle diameter determined by the longitudinal axes of the bearing pins 23.

In FIG. 9 of the drawing, there is shown another modified construction of the chain link 11, together with another, neighboring, identical chain link 11 which is indicated in dash-dotted lines, as well as with a portion of an associated sprocket wheel 12, which is also indicated in dash-dotted lines. This particular chain link construction is basically a variant of that depicted in FIG. 8 of the drawing, in that it differs from the chain link 11 according to FIG. 8 in that a preferably circularly cylindrical roller 42 is rotatably supported on the inwardly projecting regions 23' of the bearing pins 23. The respective roller 42 has the configuration of a circularly cylindrical short tube and it may consist, for instance, of hardened steel. The roller 42 is supported on the bearing pin regions 23' for rotation about its own longitudinal axis which coincides with the longitudinal axis of the bearing pins 23. This rotatable roller 42 accordingly constitutes the entraining element or portion of this chain link 11, which penetrates into the tooth spaces 25 of the chain sprocket wheel 12 to serve for positive coupling of the chain link 11 with the sprocket wheel 12.

Figure 11:
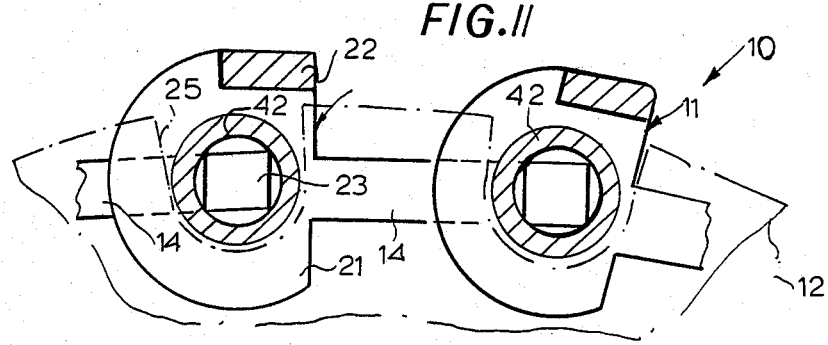
FIG. 11 is a view corresponding to that of FIG. 10 but of the modification of FIG. 9.
Figure 12:
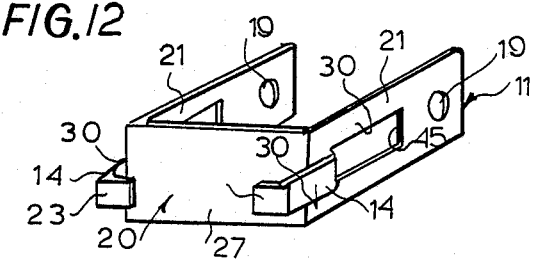
FIG. 12 is a perspective view of an additional modification of the construction of the chain link of the present invention.

A portion of such a link chain 10, which is made up of such one-piece chain links 11 in accordance with FIG. 9, is shown in FIG. 11 in a longitudinal section. It may be seen that this particular link chain 10 thus constitutes a roller chain. This roller chain 10 has an extremely simple and cost-effective construction, this construction being considerably simpler and more economical than that of lug roller chains. When this roller chain 10 of the present invention meshes with the sprocket wheel 12, then its rollers 42 penetrate into the tooth spaces 25 of the sprocket wheel 12 for entrainment of this sprocket wheel 12 by the roller chain 10, or for guidance or entrainment of the roller chain 10 by the sprocket wheel 12. In the illustrated construction, the tooth spaces 25 of the sprocket wheel 12 are so deep that the rollers 42 fully penetrate into or enter such tooth spaces 25. However, it is also possible, without running into any problems, so to reduce the diameter of the sprocket wheel 12 that the rollers 42 no longer fully penetrate into the tooth spaces 25 of the sprocket wheel 12.

In this particular construction, each individual chain link 11 consists of a unitary main body which is constituted by the bracket 20 and the arms 14 with the bearing pins 23, which unitary main body may be preferably produced by stamping and bending from a metal sheet, and also consists of the roller 42.

As illustrated in the drawing, the arms 14 of each chain link 11 are respectively arranged on the two legs 21 of the bracket 20. This is particularly advantageous from the viewpoint of construction and that of simplicity, and it renders possible the achievement of other advantages, for instance, an especially deep engagement of the chain links 11 into the sprocket wheels 12. However, it is also contemplated, in many instances, such as for example when the chain link 11 is constructed in accordance with FIG. 9 of the drawing, to let the two arms 14 extend from the center web 22 of the bracket 20.

On the brackets 20 or on the arms 14, preferably on the transverse webs 22 of the U-shaped brackets 20 of the chain links 11, or of a partial number of such chain links 11, there can often advantageously be taken certain measures, such as, preferably, at least one opening can be provided therein, these measures then serving for the mounting or securing of additional parts, such as of conveyance components such as, for instance, rods, pins, fingers or the like, in order to effect, for example, entrainment of material to be conveyed for travel with the chain 10, or of other components, such as, for example, working components, protective components, transporting components and the like. So, for instance, one or two openings can often advantageously be arranged in the center web 22, these openings serving for the attachment of such components, for link 11 are each constituted by a leg 21 of the U-shaped bracket 20 which are connected by a tranverse web 22, and by an arm 14. However, in this instance, the plane of the transverse web 22 is oriented perpendicularly to the advancement and longitudinal direction of the chain link 11 and, in the event that the chain 10 cooperates with a sprocket wheel, constitutes an entraining element which penetrates into the spaces between the teeth of the sprocket wheel. The two arms 14 are partially punched out of the respective associated legs 21, and they are bent back through 180° as illustrated The free ends of the arms 14 are angled in order to provide the bearing pins 23. The bearing holes 19 are provided at the free regions of the legs 14.

Even the chain link 11 of this construction can be manufactured in a very economical manner out of sheet metal, by punching out and bending. In this case, there is obtained an especially low amount of punching waste, inasmuch as the preform of this chain link 11 is rectangular, so that it can be punched out from a band having a width corresponding to the width of the U-shaped bracket 20.

Figure 13:
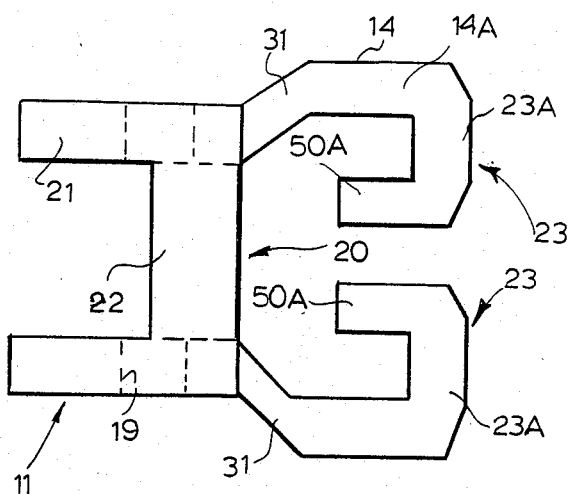
FIG. 13 is a view of another variant of the invention similar to that of FIG. 3.

FIG. 13 is a view of another variant of the invention similar to that of FIG. 3. Here in each bearing pin there is also provided an inclined region, or outwardly flaring portion 31, which is again followed by a center portion 14A of the arm 14, which merges in turn with an end portion part 23A, which is bent inwardly so as to extend in a direction approximately parallel to that of the transverse web 22, and finally ending in a free terminal part 50A bent in a direction approximately parallel with the longitudinal direction along which the center portions 14A extend.

Figure 14:
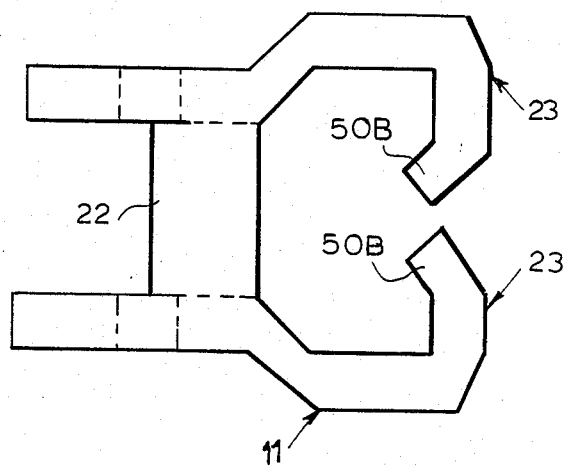
FIG. 14 is a view of still another variant of the invention similar to that of FIG. 13.

FIG. 14 is similar to the construction of FIG. 13, except that the free terminal parts 50B extend here in a direction approximately parallel with that of the outwardly flaring potions 31.

As the present invention has been described and illustrated herein as embodied in some specific constructions of chain links, it is not limited to the details of these particular constructions, since various modifications and structural changes are possible and contemplated by the present invention. Thus, the scope of the present invention is to be determined exclusively by the appended claims.

I claim:

1. An elongated link chain comprising a plurality of hingedly connected chain links,
   each chain link being made of punched out sheet metal defining a first plane, and comprising
   two lateral walls extending in the longitudinal direction of the chain and spaced from one another in a direction transverse to said longitudinal direction,
   at least one transverse web in said first plane and rigidly interconnecting said lateral walls for holding said walls in position with respect to one another,
   each lateral wall including an arm, each arm having an end portion constituting a bearing pin,
   each of said lateral walls having a separate bearing hole punched-out in said sheet metal for receiving the respective associated bearing pin of another identical chain link which is arranged adjacently to said bearing holes, said separate bearing holes being made coaxial with one another by bending said lateral walls in a direction approximately at right angles to said first plane, so as to extend in a second plane, and to constitute an approximately U-shaped bracket with said transverse web, in which the bearing holes are spaced at an axial distance from one another,
   said bearing holes defining a first axis, and said parts of respective of said end portions of said bearing pins defining a second axis, said axes being parallel to one another,
   said bearing pins being bent back so that at least parts of respective of said end portions extend in a direction approximately parallel to that of said transverse web.

2. The link chain as defined in claim 1, wherein each arm is bent in a direction away from said transverse web so as to have an initially outwardly flaring portion, a center portion bent with respect to said outwardly flaring portion so as to extend at least partly in a plane approximately parallel to said second plane, and wherein said end portion parts are bent inwardly.

3. The link chain as defined in claim 2, wherein said end portion parts include free terminal parts aligned with one another.

4. The link chain as defined in claim 2, wherein said end portion parts include free terminal parts bent in a direction approximately parallel with that of said outwardly flaring portions so as to extend towards said transverse web.

5. The link chain as defined in claim 2, wherein said end portion parts include free terminal parts bent in a direction transverse to said longitudinal direction so as to extend towards said transverse web.

6. The link chain as defined in claim 2, wherein said end portion parts include free terminal parts bent in a direction approximately parallel with said longitudinal direction so as to extend towards said transverse web.

* * * * *